US010308283B2

(12) United States Patent
Inagaki

(10) Patent No.: US 10,308,283 B2
(45) Date of Patent: Jun. 4, 2019

(54) PARKING ASSIST APPARATUS

(71) Applicant: AISIN SEIKI KABUSHIKI KAISHA, Kariya-shi, Aichi-ken (JP)

(72) Inventor: Hiroki Inagaki, Okazaki (JP)

(73) Assignee: AISIN SEIKI KABUSHIKI KAISHA, Kariya-shi, Aichi-ken (JP)

( * ) Notice: Subject to any disclaimer, the term of this patent is extended or adjusted under 35 U.S.C. 154(b) by 0 days.

(21) Appl. No.: 15/704,077

(22) Filed: Sep. 14, 2017

(65) Prior Publication Data
US 2018/0215413 A1 Aug. 2, 2018

(30) Foreign Application Priority Data

Feb. 2, 2017 (JP) ................. 2017-017208

(51) Int. Cl.
G08G 1/14 (2006.01)
B62D 15/02 (2006.01)
G08G 1/16 (2006.01)
B60W 30/06 (2006.01)
G01S 7/56 (2006.01)
(Continued)

(52) U.S. Cl.
CPC ........... *B62D 15/028* (2013.01); *B60W 30/06* (2013.01); *B62D 15/027* (2013.01); *B62D 15/0285* (2013.01); *G01S 7/56* (2013.01); *G06K 9/00805* (2013.01); *G08G 1/168* (2013.01); *B60T 2201/10* (2013.01); *G01S 2013/9314* (2013.01)

(58) Field of Classification Search
CPC .............. B62D 15/028; B62D 15/0285; B62D 15/027; G06K 9/00805; B60W 30/06; G08G 1/168; G01S 7/56; G01S 2013/9314; B60T 2201/10

USPC ............ 340/932.2, 435, 436, 438, 937, 903
See application file for complete search history.

(56) References Cited

U.S. PATENT DOCUMENTS

2010/0070139 A1* 3/2010 Ohshima ................... B60R 1/00
701/42
2010/0231416 A1* 9/2010 Wu ......................... G08G 1/168
340/932.2
(Continued)

FOREIGN PATENT DOCUMENTS

EP 2581273 A1 4/2013
EP 2583869 A1 4/2013
(Continued)

OTHER PUBLICATIONS

Communication dated Apr. 19, 2018, from the European Patent Office in counterpart European Application No. 17190788.4.
(Continued)

Primary Examiner — Anh V La
(74) Attorney, Agent, or Firm — Sughrue Mion, PLLC

(57) ABSTRACT

A parking assist apparatus includes: a peripheral image generation portion that generates an overhead image of a periphery viewed from above based on a captured image of a periphery of a vehicle; and a display image generation portion that generates a display image by superimposing a host vehicle image displaying a host vehicle on one of left and right sides in the overhead image and superimposing a target frame displaying a target of a movement destination of the vehicle on the other of the left and right sides in the overhead image in an assist mode of a forward parking or a backward exit.

5 Claims, 7 Drawing Sheets

(51) Int. Cl.
*G06K 9/00* (2006.01)
*G01S 13/93* (2006.01)

(56) References Cited

U.S. PATENT DOCUMENTS

| | | | | |
|---|---|---|---|---|
| 2013/0010118 A1* | 1/2013 | Miyoshi | ................... | B60R 1/00 348/148 |
| 2013/0063601 A1* | 3/2013 | Wakabayashi | ............ | B60R 1/00 348/148 |
| 2013/0144492 A1* | 6/2013 | Takano | .............. | B62D 15/0285 701/42 |
| 2013/0162829 A1* | 6/2013 | Kadowaki | ............ | B62D 15/028 348/148 |
| 2014/0244070 A1* | 8/2014 | Inagaki | .............. | B62D 15/0285 701/1 |
| 2014/0333455 A1* | 11/2014 | Lee | ...................... | B62D 15/027 340/932.2 |
| 2016/0094807 A1 | 3/2016 | Fujio et al. | | |

FOREIGN PATENT DOCUMENTS

| | | |
|---|---|---|
| JP | 2009-049943 A | 3/2009 |
| JP | 2016-066322 A | 4/2016 |

OTHER PUBLICATIONS

Communication dated Apr. 2, 2019 from the European Patent Office in application No. 17190788.4.

* cited by examiner

PARKING ASSIST APPARATUS

CROSS REFERENCE TO RELATED APPLICATIONS

This application is based on and claims priority under 35 U.S.C. § 119 to Japanese Patent Application 2017-017208, filed on Feb. 2, 2017, the entire contents of which are incorporated herein by reference.

TECHNICAL FIELD

This disclosure relates to a parking assist apparatus.

BACKGROUND DISCUSSION

There is known a parking assist apparatus that assists parking or exit by a driver by being mounted on a vehicle such as an automobile and displaying a host vehicle image and an overhead image of a periphery of the vehicle on a display device.

Examples of related art include JP 2009-49943A (Reference 1) and JP 2016-66322A (Reference 2).

However, in a case of forward parking, backward exit, or the like, in which the parking assist apparatus described above requires a movement distance up to the maximum steering angle and a set path from an assist starting point to a target frame for parking is lengthened (for example, about 7 m), the host vehicle image and the target frame become outside the display image. Therefore, there is a problem that it is difficult for the parking assist apparatus described above to display an appropriate display image including the host vehicle image and the target frame on the display device.

Thus, a need exists for a parking assist apparatus which is not susceptible to the drawback mentioned above.

SUMMARY

A parking assist apparatus according to an aspect of this disclosure includes: a peripheral image generation portion that generates an overhead image of a periphery viewed from above based on a captured image of a periphery of a vehicle; and a display image generation portion that generates a display image by superimposing a host vehicle image displaying a host vehicle on one of left and right sides in the overhead image and superimposing a target frame displaying a target of a movement destination of the vehicle on the other of the left and right sides in the overhead image in an assist mode of a forward parking or a backward exit.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
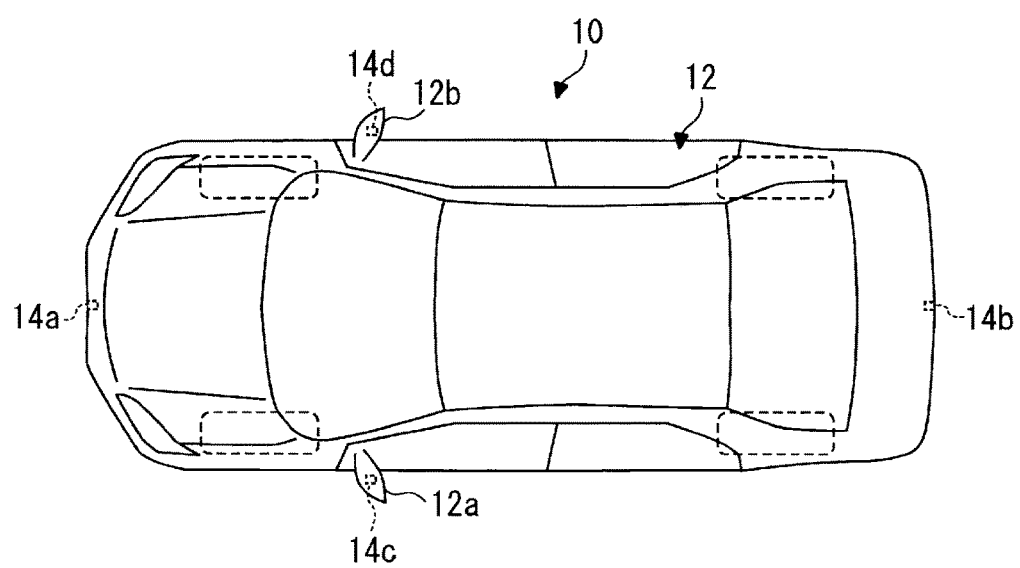
FIG. 1 is a plan view of a vehicle according to an embodiment.

The same reference numerals are given to the same constituent elements in the following exemplary embodiments and the like, and redundant explanation will be appropriately omitted.

Embodiment

FIG. 1 is a plan view of a vehicle 10 according to the embodiment. As illustrated in FIG. 1, the vehicle 10 includes a vehicle body 12 and four imaging portions 14a, 14b, 14c, and 14d. In a case where it is not necessary to distinguish the imaging portions 14a, 14b, 14c, and 14d, they are described as the imaging portion 14.

The vehicle body 12 constitutes an occupant compartment where occupants ride. The vehicle body 12 accommodates and holds the imaging portion 14 and the like.

The imaging portion 14 is, for example, a digital camera incorporating an imaging device such as a charge coupled device (CCD) or CMOS image sensor (CIS). The imaging portion 14 can output a moving image including a plurality of frame images generated at a predetermined frame rate or data of a still image as data of a captured image. Each of the imaging portions 14 has a wide angle lens or a fisheye lens, and can image a range of 140° to 190° in the horizontal direction. The optical axis of the imaging portion 14 is set obliquely downward. Therefore, the imaging portion 14 outputs captured image data imaged the periphery including the road surface of a periphery of the vehicle 10.

The imaging portion 14 is provided on a periphery of the vehicle body 12. For example, the imaging portion 14a is provided at a center portion (for example, front bumper) of the front end portion of the vehicle body 12 in the lateral direction. The imaging portion 14a generates a captured image obtained by imaging a periphery of the front side of the vehicle 10. The imaging portion 14b is provided at a center portion (for example, rear bumper) of the rear end portion of the vehicle body 12 in the lateral direction. The imaging portion 14b generates a captured image obtained by imaging a periphery of the rear side of the vehicle 10. The imaging portion 14c is provided at a center portion (for example, left side mirror 12a) of the left end portion of the vehicle body 12 in the front and rear direction. The imaging portion 14c generates a captured image obtained by imaging a periphery of the left side of the vehicle 10. The imaging portion 14d is provided at a center portion (for example, right side mirror 12b) of the right end portion of the vehicle body 12 in the front and rear direction. The imaging portion 14d generates a captured image obtained by imaging a periphery of the right side of the vehicle 10.

Figure 2:
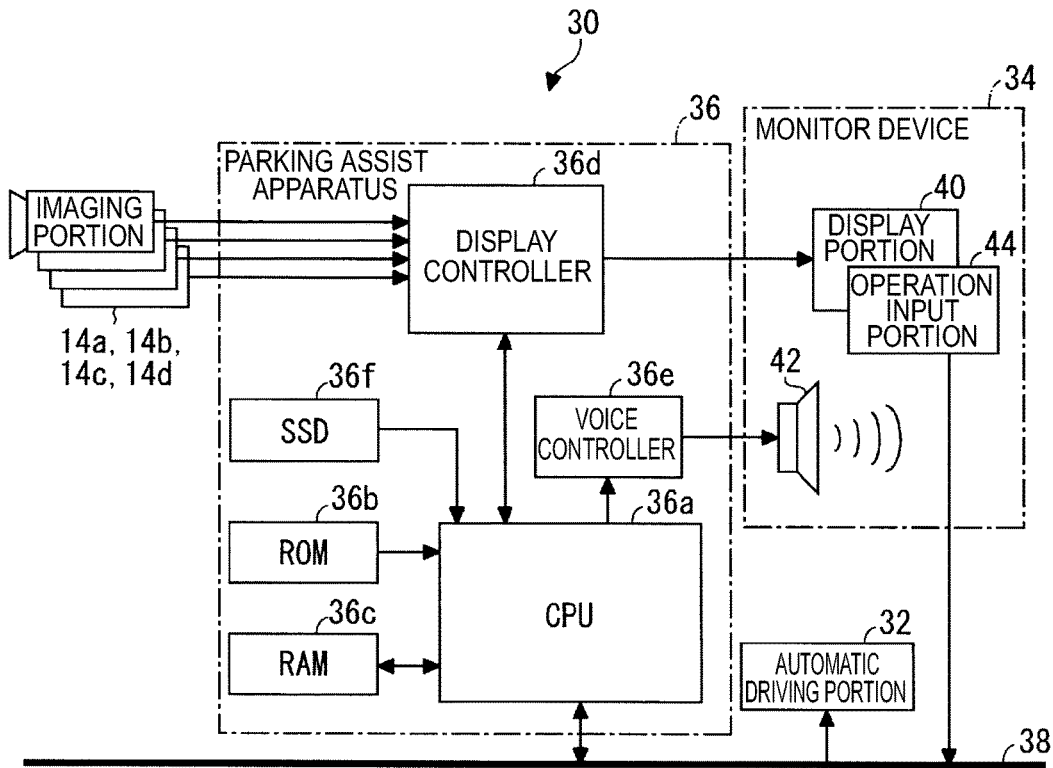
FIG. 2 is a block diagram illustrating a configuration of a parking assist system mounted on the vehicle.

FIG. 2 is a block diagram illustrating the configuration of a parking assist system 30 mounted on the vehicle 10. As illustrated in FIG. 2, the parking assist system 30 further includes an automatic driving portion 32, a monitor device 34, a parking assist apparatus 36, and an in-vehicle network 38.

The automatic driving portion 32 controls an accelerator, a brake, a steering wheel, and the like based on an instruction from the parking assist apparatus 36 to automatically drive the vehicle 10 during the parking and during the exit, or the like.

The monitor device 34 is provided in a dashboard or the like in the occupant compartment. The monitor device 34 includes a display portion 40, a voice output portion 42, and an operation input portion 44.

The display portion 40 displays an image based on the image data transmitted by the parking assist apparatus 36. The display portion 40 is, for example, a display device such as a liquid crystal display (LCD) or an organic electro luminescence display (OELD).

The voice output portion 42 outputs voice based on the voice data transmitted by the parking assist apparatus 36. The voice output portion 42 is, for example, a speaker. The voice output portion 42 may be provided at a different position from the display portion 40 in the occupant compartment.

The operation input portion 44 receives an input by an occupant. The operation input portion 44 is, for example, a touch panel. The operation input portion 44 is provided on a display screen of the display portion 40. The operation input portion 44 is configured to be capable of transmitting the image displayed by the display portion 40. Accordingly, the operation input portion 44 can visually recognize the image displayed on the display screen of the display portion 40 by the occupant. The operation input portion 44 receives an instruction input by touching the position corresponding to the image displayed on the display screen of the display portion 40 by the occupant and thus transmits the instruction to the parking assist apparatus 36.

The parking assist apparatus 36 is a computer including a microcomputer such as an electronic control unit (ECU). The parking assist apparatus 36 acquires data of the captured image from the imaging portion 14. The parking assist apparatus 36 transmits data relating to an image or voice generated based on the captured image or the like to the monitor device 34. The parking assist apparatus 36 controls the automatic driving portion 32 to assist the vehicle 10 by automatically driving the vehicle 10 during the parking or during the exit. The parking assist apparatus 36 includes a central processing unit (CPU) 36a, a read only memory (ROM) 36b, a random access memory (RAM) 36c, a display controller 36d, a voice controller 36e, a solid state drive (SSD) 36f. The CPU 36a, the ROM 36b and the RAM 36c may be integrated in the same package.

The CPU 36a is an example of a hardware processor, reads a program stored in a nonvolatile storage device such as the ROM 36b, and executes various calculation processing and control according to the program. For example, the CPU 36a executes image processing such as an image for parking assist to be displayed on the display portion 40.

The ROM 36b stores each program and parameters necessary for executing the program and the like. The RAM 36c temporarily stores various data used in the calculation in the CPU 36a. The display controller 36d mainly executes processing of the image obtained by the imaging portion 14, the data conversion of the display image to be displayed on the display portion 40 among the calculation processing by the parking assist apparatus 36. The voice controller 36e mainly executes processing of the voice to be output to the voice output portion 42 among the calculation processing by the parking assist apparatus 36. The SSD 36f is a rewritable nonvolatile storage portion and maintains data even in a case where the power source of the parking assist apparatus 36 is turned off.

In the embodiment, the parking assist apparatus 36 cooperates with hardware and software (control program) to manage assist processing during parking and exit of the vehicle 10. The parking assist apparatus 36 generates display images 68 and 70 in which the host vehicle image and the target frame are superimposed on the top view type peripheral image generated based on the captured image including the peripheral image captured by the imaging portion 14 and thus displays the display images on the display portion 40. The parking assist apparatus 36 controls the automatic driving portion 32 to move the vehicle 10 to the target frame by automatic driving to assist the parking and the exit.

The in-vehicle network 38 is, for example, a controller area network (CAN). The in-vehicle network 38 electrically connects the automatic driving portion 32, the parking assist apparatus 36, and the operation input portion 44 so that signals and information can be transmitted and received with each other.

Figure 3:
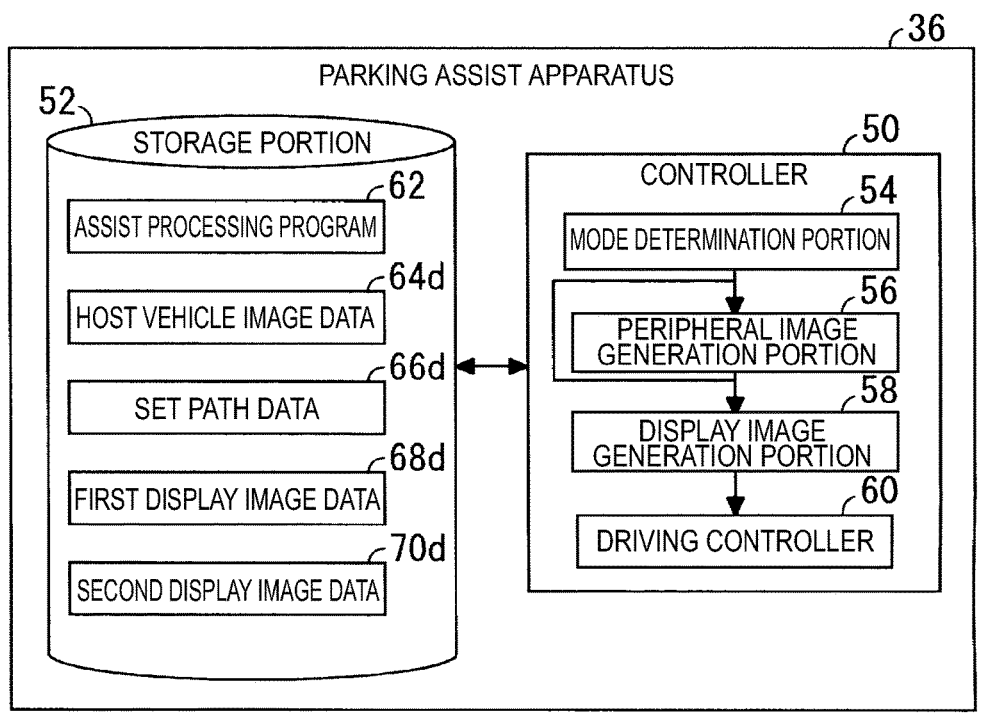
FIG. 3 is a functional block diagram explaining functions of the parking assist apparatus.

FIG. 3 is a functional block diagram explaining the function of the parking assist apparatus 36. As illustrated in FIG. 3, the parking assist apparatus 36 includes a controller 50 and a storage portion 52.

The controller 50 is realized, for example, using a function of the CPU 36a. The controller 50 includes a mode determination portion 54, a peripheral image generation portion 56, a display image generation portion 58, and a driving controller 60. By reading the automatic driving assist program stored in the storage portion 52, the controller 50 may realize the functions of the mode determination portion 54, the peripheral image generation portion 56, the display image generation portion 58, and the driving controller 60. A portion or all of the mode determination portion 54, the peripheral image generation portion 56, the display image generation portion 58, and the driving controller 60 may be configured by hardware such as a circuit including an application specific integrated circuit (ASIC).

For example, in a state such as a navigation mode in which a navigation image is displayed, the mode determination portion 54 receives from the operation input portion 44 instructions of mode switching to an assist mode that assists the parking or the exit by automatic driving by an occupant. Furthermore, after the mode switching from the navigation mode to the assist mode, the mode determination portion 54 determines the parking assist mode or the exit assist mode selected by the occupant based on the input from the operation input portion 44. The assist mode includes a forward parking mode and a backward parking mode. Further, the forward parking mode includes a left forward parking mode for parking to the left front target frame, a right forward parking mode for parking to the right front target frame, a right backward exit mode for exiting to the right rear target frame, and left backward exit mode for exiting to the left rear target frame. The backward parking mode includes a left backward parking mode for parking to the left rear target frame, a right backward parking mode for parking to the right rear target frame, a right forward exit mode for exiting to the right front target frame, and a left forward exit mode for exiting to the left front target frame.

In the assist mode of forward parking or backward exit, the peripheral image generation portion 56 generates an overhead image of the periphery viewed from above, based on the captured image of the periphery of the vehicle 10 acquired from the imaging portion 14. The overhead image is also referred to as a top view image or a bird's eye image. The peripheral image generation portion 56 generates the overhead image by executing image processing and synthesis processing on a plurality of captured images obtained from the plurality of imaging portions 14. Specifically, the peripheral image generation portion 56 generates an overhead image centered on the parking direction side or the exit direction side as viewed from the vehicle 10, that is, the overhead image centered on a direction side where the target frame is set as viewed from the vehicle 10. For example, in a case of the left forward parking mode, since the target frame is set to the left front, the peripheral image generation portion 56 generates an overhead image centered on the left front of the vehicle 10. The peripheral image generation portion 56 generates an overhead image of the vehicle 10 in all directions based on the captured image and then trims a necessary region on the traveling direction side of the vehicle 10, and thus an overhead image 72 centered on the traveling direction side of the vehicle 10 may be generated. In addition, in the backward parking or forward exit assist mode, the peripheral image generation portion 56 generates an overhead image centered on the position of the vehicle 10 based on the captured image. The peripheral image generation portion 56 outputs the generated overhead image together with the captured image to the display image generation portion 58. In the following description, the position in the overhead image will be described based on the front, rear, left and right directions of the vehicle 10.

In the assist mode of the forward parking or the backward exit, the display image generation portion 58 generate a first display image by superimposing the host vehicle image on one of left and right sides of the overhead image and by superimposing the target frame displaying the target of the movement destination of the vehicle 10 on the other of the left and right sides in the overhead image.

Specifically, in the forward parking assist mode, the display image generation portion 58 superimposes the host vehicle image on the rear side in the overhead image. In the backward exit assist mode, the display image generation portion 58 superimposes the host vehicle image on the front side in the overhead image. In other words, in a case of forward parking and backward exit, the display image generation portion 58 superimposes the host vehicle image on a side opposite to the traveling direction in the overhead image as viewed from the center of the overhead image.

In a case of the assist mode for assisting the forward parking or the backward exit to the target frame on the left side of the vehicle 10, the display image generation portion 58 superimposes the target frame on the left side in the overhead image. In a case of the assist mode for assisting the forward parking or the backward exit to the target frame on the right side of the vehicle 10, the display image generation portion 58 superimposes the target frame on the right side in the overhead image. In other words, the display image generation portion 58 superimposes the target frame on a portion on a side opposite to the host vehicle image in the overhead image.

For example, in a case of the left forward parking mode, since the vehicle 10 is moved to the left front and is parked, the display image generation portion 58 superimposes the host vehicle image on the right rear side of the overhead image. The display image generation portion 58 superimposes the target frame on a preset set path in which the host vehicle image is set in the overhead image as a starting point based on set path data 66d in the storage portion 52. For example, in a case of the left forward parking mode, the display image generation portion 58 superimposes the target frame on the left front position in the overhead image.

In the assist mode of the backward parking and the forward exit, the display image generation portion 58 generates a first display image by superimposing the host vehicle image on the center in the overhead image and superimposing the target frame on the set path in which the host vehicle image is set in the overhead image as a starting point.

The display image generation portion 58 generates a second display image in which the target frame is superimposed on the captured image. Specifically, the display image generation portion 58 superimposes the target frame on the captured image so that it is at the same position as the real world position of the target frame in the first display image in the real world and thus the second display image is generated.

The display image generation portion 58 stores the first display image data 68d and the second display image data 70d which are the data of the generated first display image and the generated second display image in the storage portion 52 and displays the first display image and the second display image on the display portion 40.

When the driving controller 60 determines the start of the automatic driving based on the position of the target frame and the like and starts the automatic driving, the driving controller 60 controls the automatic driving portion 32 to automatically drive the vehicle 10 and moves the vehicle 10 to the target frame along the preset set path.

The storage portion 52 stores programs to be executed by the controller 50, data necessary for execution of the programs, data generated by execution of the programs, and the like. For example, the storage portion 52 stores an assist processing program 62 executed by the controller 50. The storage portion 52 stores the host vehicle image data 64d necessary for executing the assist processing program 62 and the set path data 66d from the host vehicle position to the target frame. The set path data 66d may include data of a plurality of set paths associated with any one of the vehicle speed at the time of starting the assist, the steering angle of the steering wheel, and the like. The storage portion 52 temporarily stores the first display image data 68d and the second display image data 70d generated by execution of the assist processing program 62.

Figure 4:
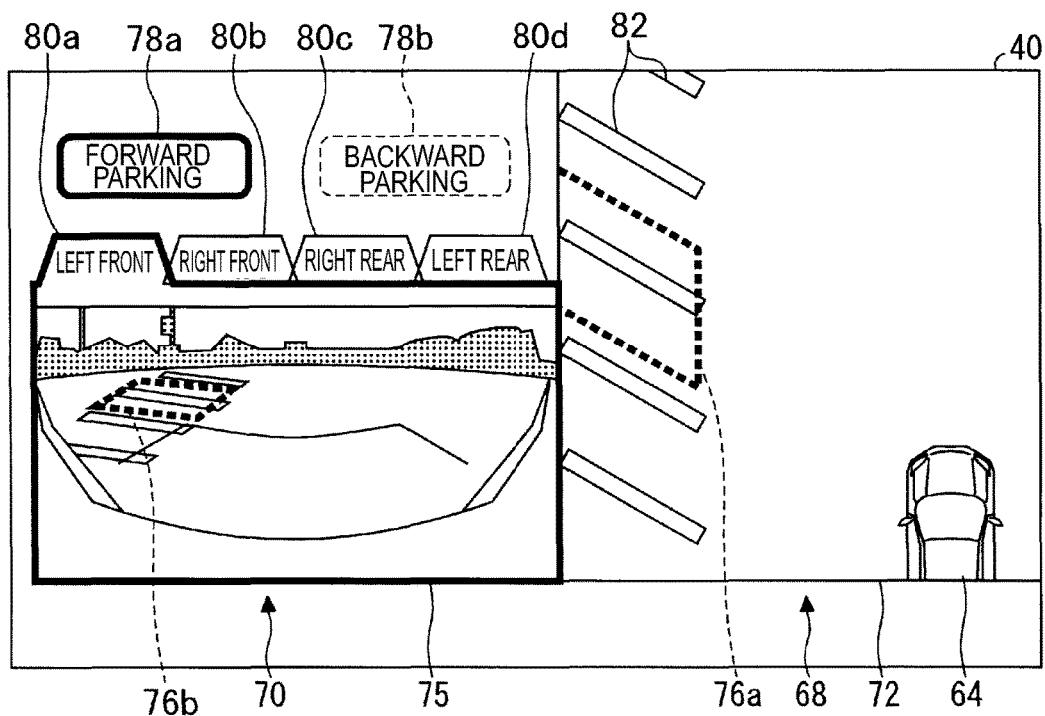
FIG. 4 is a diagram illustrating an example of a display image in a left forward parking mode in parking assist for automatic driving.

FIG. 4 is a diagram illustrating an example of the display images 68 and 70 in the left forward parking mode in the parking assist of automatic driving. In the left forward parking mode, the display image generation portion 58 generates the first display image 68 including the overhead image 72 illustrated in FIG. 4 and the second display image 70 including a captured image 75 and thus displays the first display image 68 and the second display image 70 on the display portion 40.

Specifically, the peripheral image generation portion 56 generates an overhead image 72 which is a peripheral image centered on the left front which is the parking direction of the vehicle 10 from the captured images of the periphery acquired by the imaging portions 14a, 14b, and 14c and outputs the overhead image 72 to the display image generation portion 58. The display image generation portion 58 superimposes a portion of the host vehicle image 64 (for example, front half portion of host vehicle image 64) on the right rear end portion of the overhead image 72 which is a side opposite to the parking direction. In addition, the display image generation portion 58 superimposes a target frame 76a on the set path (for example, end point of set path) in which the host vehicle image 64 of the overhead image 72 is set as a starting point in the parking direction side in the overhead image 72. Accordingly, the display image generation portion 58 generates the first display image 68. An example of the shape of the target frame 76a in the real world is 5.1 m in length in the front and rear direction of the vehicle 10 after parking, 30° in inclination with respect to the front and rear direction of the vehicle 10, and 2.9 m in length in a direction inclined with respect to the front and rear direction of the vehicle 10. The shape of the target frame 76a may be appropriately changed according to the size of the vehicle 10 and the shape of the parking frame line 82 or the like indicated by a white line or the like in a parking lot.

The display image generation portion 58 superimposes the target frame 76b on the captured image 75 captured by the imaging portion 14b and thus generates the second display image 70. Here, the display image generation portion 58 superimposes the target frame 76b on the captured image 75 and thus generates the second display image 70 so that the positions of the target frame 76a of the first display image 68 and the target frame 76b of the second display image 70 in the real world are at the same position.

The display image generation portion 58 may display a mode switching button on the second display image 70. For example, the display image generation portion 58 may display a forward parking button 78a for selecting the forward parking mode and a backward parking button 78b for selecting the backward parking mode as the mode switching buttons. Further, in the forward parking mode, the display image generation portion 58 may display a left forward parking button 80a for selecting the left forward parking mode, a right forward parking button 80b for selecting the right forward parking mode, a right backward exit button 80c for selecting the right backward parking mode, and a left backward exit button 80d for selecting the left backward parking mode. In the example illustrated in FIG. 4, the occupant selects the left forward parking mode by operating the forward parking button 78a and the left forward parking button 80a as indicated by the thick frame. In a case where it is unnecessary to distinguish the buttons 78a and 78b and the buttons 80a to 80d, it is described as a button 78 or a button 80.

Figure 5:
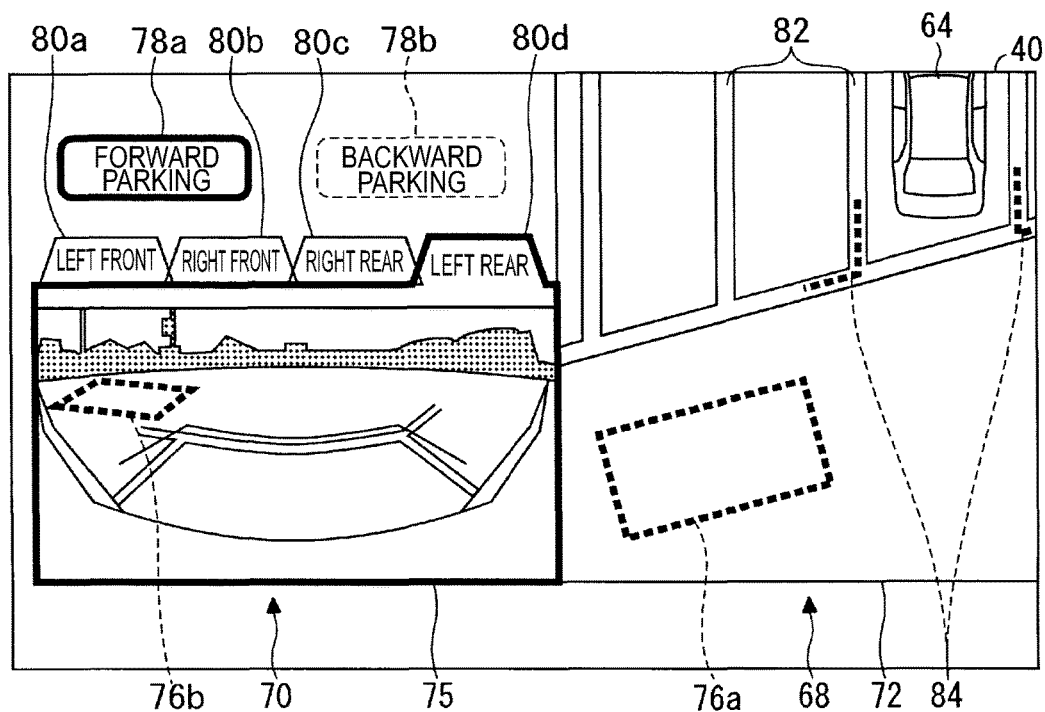
FIG. 5 is a diagram illustrating an example of a display image in a left backward exit mode in the parking assist for automatic driving.

FIG. 5 is a diagram illustrating an example of the display images 68 and 70 in the left backward exit mode in the parking assist for automatic driving. In the left backward exit mode, the display image generation portion 58 generates the first display image 68 including the overhead image 72 illustrated in FIG. 5 and the second display image 70 including the captured image 75 and thus displays the first display image 68 and the second display image 70 on the display portion 40.

Specifically, the peripheral image generation portion 56 generates an overhead image 72 which is a peripheral image centered on the left rear which is the exit direction of the vehicle 10, from captured images of the periphery acquired from the imaging portions 14b, 14c, and 14d and thus outputs the overhead image 72 to the display image generation portion 58. The display image generation portion 58 superimposes a portion of the host vehicle image 64 (for example, rear half portion of host vehicle image 64) on the right front end portion of the overhead image 72. In addition, the display image generation portion 58 superimposes the target frame 76a on the set path (for example, end point of set path) in which the host vehicle image 64 of the overhead image 72 is set as a starting point. Accordingly, the display image generation portion 58 generates the first display image 68. An example of the shape of the target frame 76a in the real world is 5.1 m in length in the front and rear direction of the vehicle 10 after the parking and 2.5 m in length in the lateral direction of the vehicle 10. The shape of the target frame 76a may be appropriately changed according to the size of the vehicle 10 and the shape of the parking frame line 82 or the like indicated by a white line or the like in the parking lot.

The display image generation portion 58 may display the exit start frame 84 on the overhead image 72. The exit start frame 84 is in a position to move the parked vehicle 10 by straight traveling so as to avoid contact with an adjacent vehicle or the like. Therefore, the driving controller 60 starts turning of the vehicle 10 after exceeding the exit start frame 84. The display image generation portion 58 may recognize the parking frame line 82 of the parking lot from the captured image and display the exit start frame 84 on the parking frame line 82 or may display the exit start frame 84 based on the preset exit start frame 84. The shape of the exit start frame 84 in the real world may be configured by a side having a length of 1 m parallel to the front and rear direction of the vehicle 10 during the parking and a side having a length of 1 m inclined by 30° from the lateral direction of the vehicle 10. The shape of the exit start frame 84 may be appropriately changed according to the size of the vehicle 10 and the shape of the parking frame line 82 or the like indicated by a white line or the like in the parking lot.

The display image generation portion 58 superimposes the target frame 76b on the captured image 75 captured by the imaging portion 14b and generates the second display image 70. Here, the display image generation portion 58 superimposes the target frame 76b on the captured image 75 so that the positions of the target frame 76a of the first display image 68 and the target frame 76b of the second display image 70 in the real world are at the same position and thus generates the second display image 70.

The display image generation portion 58 may display buttons 78 and 80 for switching same mode as in FIG. 4 on the second display image 70. In the example illustrated in FIG. 5, the occupant selects the left backward exit mode by operating the forward parking button 78a and the left backward exit button 80d as indicated by the thick frame.

Figure 6:
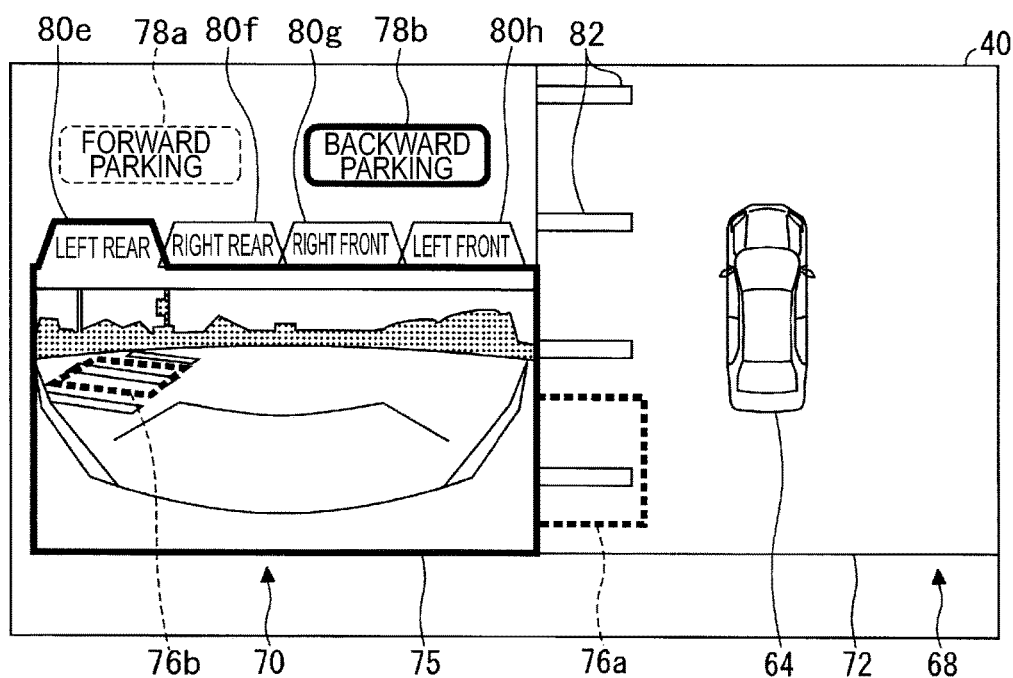
FIG. 6 is a diagram illustrating an example of a display image in a left backward parking mode in parking assist for automatic driving.

FIG. 6 is a diagram illustrating an example of the display images 68 and 70 in the left backward parking mode in the parking assist for automatic driving. In the left backward parking mode, the display image generation portion 58 generates the first display image 68 including the overhead image 72 illustrated in FIG. 6 and the second display image 70 including the captured image 75 and displays the first display image 68 and the second display image 70 on the display portion 40.

Specifically, the peripheral image generation portion 56 generates the overhead image 72 which is a peripheral image centered on the vehicle 10 from the captured images of the periphery acquired from the imaging portions 14a, 14b, 14c, and 14d and outputs the overhead image 72 to the display image generation portion 58. The display image generation portion 58 superimposes the host vehicle image 64 on the center of the overhead image 72. In addition, the display image generation portion 58 superimposes the target frame 76a on the set path (for example, end point of set path) in which the host vehicle image 64 of the overhead image 72 is set as a starting point. Accordingly, the display image generation portion 58 generates the first display image 68. Here, in the backward parking, since the turning radius is small and the movement distance of the vehicle 10 is short, the display image generation portion 58 can contain the target frame 76a in the first display image 68, even in the overhead image 72 centered on the vehicle 10.

The display image generation portion 58 superimposes the target frame 76b on the captured image 75 captured by the imaging portion 14b, and generates the second display image 70. Here, the display image generation portion 58 superimposes the target frame 76b on the captured image 75 so that the positions of the target frame 76a of the first display image 68 and the target frame 76b of the second display image 70 in the real world are at the same position and thus generates the second display image 70.

The display image generation portion 58 may display the mode switching button in the second display image 70 in the backward parking mode. For example, the display image generation portion 58 may display the forward parking button 78a for selecting the forward parking mode and the backward parking button 78b for selecting the backward parking mode as the mode switching button. Further, in the backward parking mode, the display image generation portion 58 may display a left backward parking button 80e for selecting the left backward parking mode, a right backward parking button 80f for selecting the right backward parking mode, a right forward exit button 80g for selecting a right forward exit mode, and the left forward exit button 80h for selecting the left forward exit mode. In the example illustrated in FIG. 6, the occupant selects the left backward parking mode by operating the backward parking button 78b and the left backward parking button 80e as indicated by the thick frame.

Figure 7:
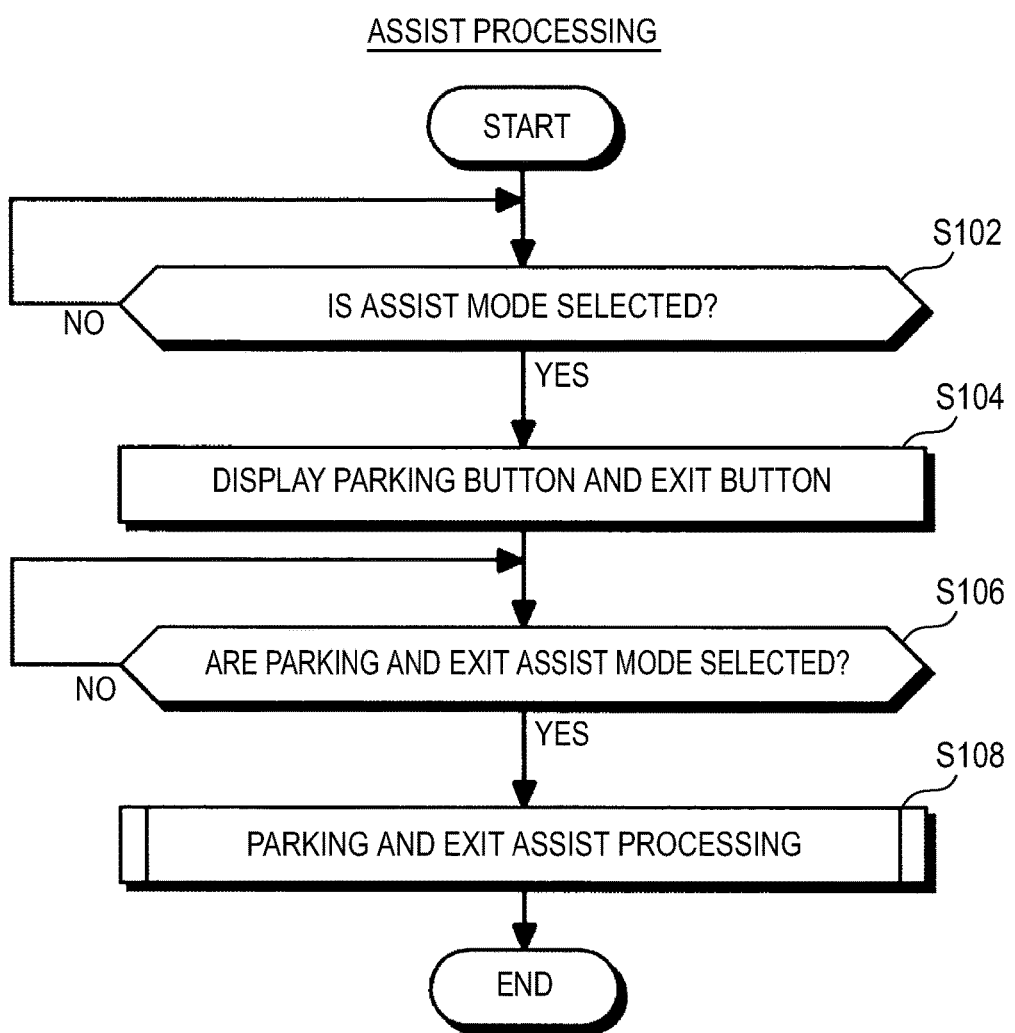
FIG. 7 is a flowchart illustrating assist processing executed by a controller.

FIG. 7 is a flowchart illustrating assist processing executed by the controller 50. The controller 50 starts the assist processing by reading the assist processing program 62. In the assist processing, the controller 50 receives and executes the selection of the parking assist mode or the exit assist mode by the occupant.

In a state where the navigation image is being displayed, the mode determination portion 54 of the controller 50 determines whether or not selection of the assist mode by automatic driving is received (S102). The mode determination portion 54 is in a standby state until selection of the assist mode is received (S102: No).

For example, when the occupant operates the assist mode button displayed together with the navigation image, the mode determination portion 54 determines that the assist mode is selected (S102: Yes), and outputs the display instructions of the buttons 78 and 80 to the display image generation portion 58.

When acquiring the display instruction of the buttons 78 and 80, the display image generation portion 58 displays the parking button 78 and the exit button 80 (S104). The display image generation portion 58 may display the display images 68 and 70 illustrated in FIG. 4 to FIG. 6 together with the buttons 78, 80 on the display portion 40.

The mode determination portion 54 determines whether or not the occupant has selected any one of the parking assist mode or the exit assist mode by the buttons 78 and 80 (S106). The mode determination portion 54 is in a standby state until being determined that the parking assist mode or the exit assist mode is selected (S106: No).

When the occupant selects any one of the buttons 78 and 80 by the operation input portion 44, the mode determination portion 54 determines that the occupant has selected any one of the parking assist mode or the exit assist mode (S106: Yes), and then outputs the information of the parking assist mode or the exit assist mode which is selected to the peripheral image generation portion 56.

The peripheral image generation portion 56, the display image generation portion 58, and the driving controller 60 execute the parking assist processing or the exit assist processing according to the parking assist mode or the exit assist mode selected by the occupant (S108).

Figure 8:
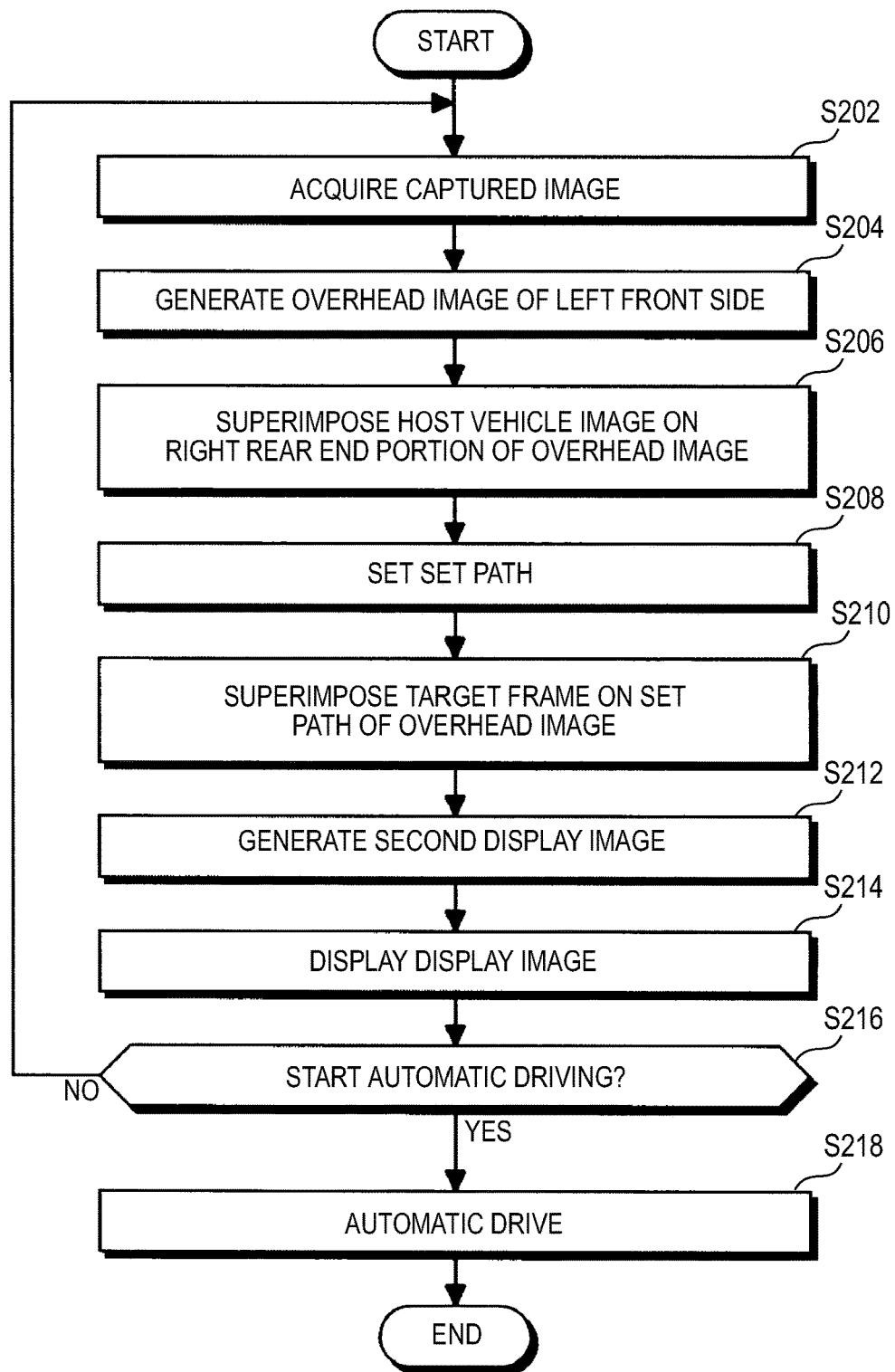
FIG. 8 is a flowchart illustrating left forward parking assist processing which is a portion of assist processing executed by the controller.

FIG. 8 is a flowchart of the left forward parking assist processing which is a portion of the parking assist processing executed by the controller 50. In a case where the occupant selects the left forward parking button 80a, the controller 50 executes the left forward parking assist processing which is one of the parking assist processing (S108).

The peripheral image generation portion 56 of the parking assist apparatus 36 acquires a captured image from the imaging portion 14 (S202). Based on the captured image, the peripheral image generation portion 56 generates an overhead image 72 centered on the left front which is the traveling direction side of the vehicle 10 and then outputs the overhead image 72 and the captured image to the display image generation portion 58 (S204).

The display image generation portion 58 superimposes a portion of the host vehicle image 64 on the end portion of the right rear side of the overhead image 72 (S206). The display image generation portion 58 sets a set path in which the position of the vehicle 10 is set as a starting point, based on the set path data 66d in the storage portion 52 (S208). The display image generation portion 58 superimposes the target frame 76a on the set path of the overhead image 72 to generate the first display image 68 as illustrated in FIG. 4 (S210).

The display image generation portion 58 superimposes the target frame 76b on the position on the captured image 75 corresponding to the position of the target frame 76a of the first display image 68, installs the buttons 78 and 80 above the captured image 75, and generates a second display image 70 as illustrated in FIG. 4 (S212).

As illustrated in FIG. 4, the display image generation portion 58 displays the display images 68 and 70 on the display portion 40 (S214).

The driving controller 60 determines whether or not automatic driving is started (S216). For example, the driving controller 60 may determine start of automatic driving when the target frames 76a and 76b overlap with the parking frame line 82 indicated by a white line or the like of the parking lot or the vehicle 10 stops. In addition, when the occupant touches the positions of the target frames 76a and 76b on the operation input portion 44 in a state where the target frames 76a and 76b overlap the parking frame line 82 of the white line of the parking lot, the driving controller 60 may determine start of the automatic driving.

When the driving controller 60 determines that automatic driving is not started (S216: No), the driving controller 60 repeats step S202 and the following steps. Accordingly, the peripheral image generation portion 56 and the display image generation portion 58 repeat generation of the display images 68 and 70 according to the movement of the vehicle 10 until the start of automatic driving and updates and displays the display images 68 and 70.

If the driving controller 60 determines the start of the automatic driving (S216: Yes), the driving controller 60 controls the automatic driving portion 32 to automatically drive the vehicle 10 and to move the vehicle 10 to the target frames 76a and 76b for parking (S218). Accordingly, the parking assist apparatus 36 ends the left forward parking assist processing which is one of the parking assist processing and ends the assist processing.

In the right forward parking assist processing which is one of the parking assist processing, the left forward parking assist processing and processing with respect to positions of left and right sides are different and the description with respect to the same processing except for the portion described above is omitted.

Figure 9:
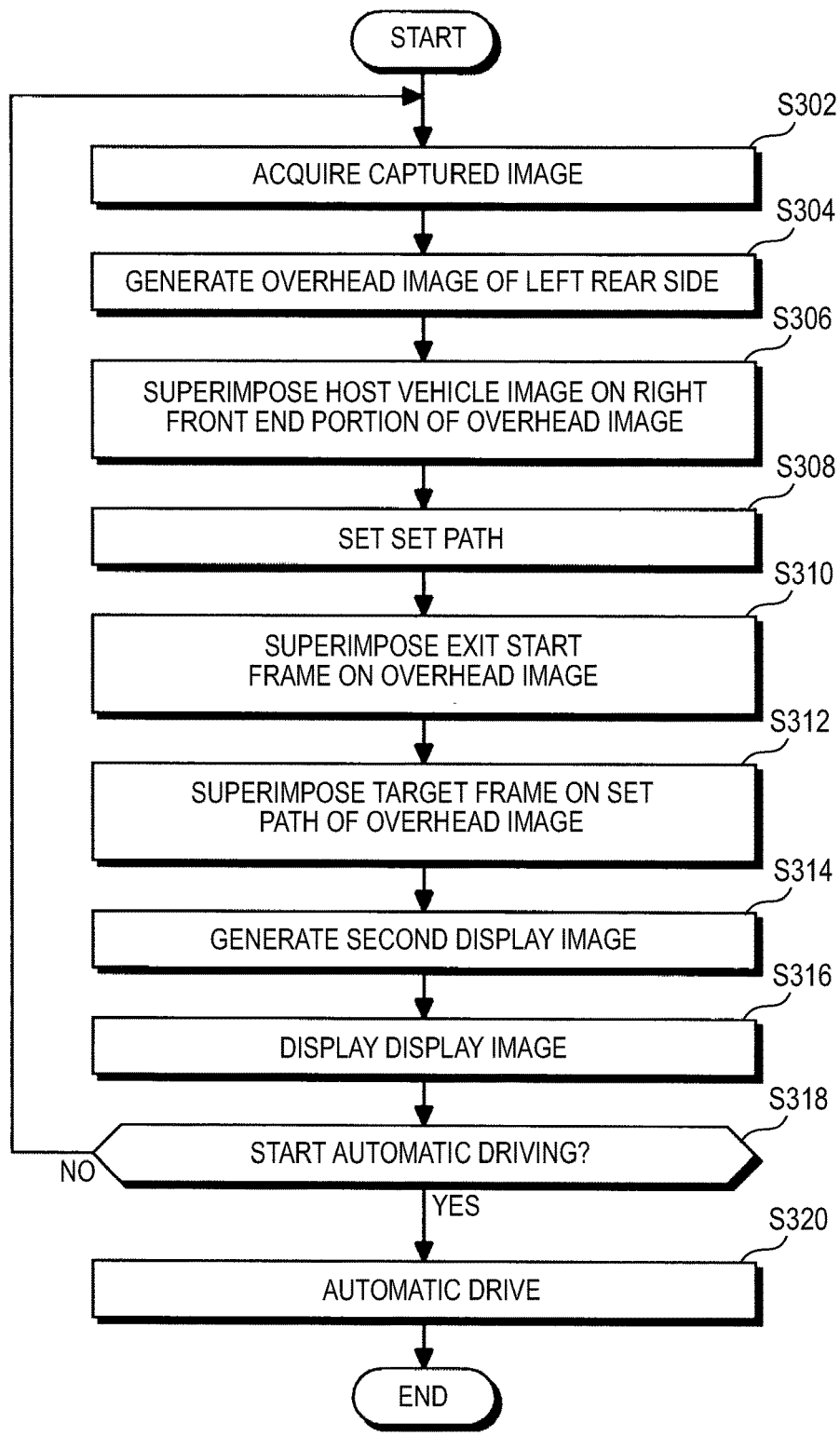
FIG. 9 is a flowchart illustrating left backward exit assist processing executed by the controller.

FIG. 9 is a flowchart of the left backward exit assist processing executed by the controller 50. In a case where the occupant selects the left backward exit button 80d, the controller 50 executes the left backward exit assist processing, which is one of the exit assist processing (S108).

The peripheral image generation portion 56 of the parking assist apparatus 36 acquires a captured image from the imaging portion 14 (S302). Based on the captured image, the peripheral image generation portion 56 generates an overhead image 72 centered on the left rear side which is the traveling direction side of the vehicle 10 and then outputs the overhead image 72 and the captured image to the display image generation portion 58 (S304).

The display image generation portion 58 superimposes a portion of the host vehicle image 64 on the end portion of the right front side of the overhead image 72 (S306). The display image generation portion 58 sets a set path in which the position of the vehicle 10 is set as a starting point (S308). The display image generation portion 58 superimposes the exit start frame 84 on the overhead image 72 (S310) and superimposes the target frame 76a on the set path of the overhead image 72 to generate the first display image 68 (S312).

The display image generation portion 58 superimposes the target frame 76b on the position on the captured image 75 corresponding to the position of the target frame 76a of the first display image 68 and installs the buttons 78 and 80 above the captured image 75, and generates the second display image 70 (S314).

As illustrated in FIG. 5, the display image generation portion 58 displays the display images 68 and 70 on the display portion 40 (S316).

The driving controller 60 determines whether or not to start automatic driving (S318). For example, when the occupant touches the positions of the target frames 76a and 76b on the operation input portion 44, the driving controller 60 may determine to start the automatic driving.

If the driving controller 60 determines that automatic driving is not started (S318: No), step S302 and the following steps are repeated. Accordingly, the peripheral image generation portion 56 and the display image generation portion 58 repeat the generation of the display images 68 and 70 until the automatic driving is started.

If the driving controller 60 determines start of the automatic driving (S318: Yes), the driving controller 60 controls the automatic driving portion 32 to automatically drive the vehicle 10 and move the vehicle 10 to the target frames 76a and 76b and causes the vehicle 10 to execute backward exit (S320). Accordingly, the parking assist apparatus 36 ends the left backward exit assist processing which is one of the exit assist processing and ends the assist processing.

In the right backward exit assist processing which is one of the exit assist processing, the left backward exit assist processing and the processing with respect to positions of left and right sides are different and thus description with respect to the same portion except for the portion described above is omitted.

As described above, in the parking assist apparatus 36, the display image generation portion 58 superimposes the host vehicle image 64 on one of the left and right sides of the overhead image 72, and superimposes the target frame 76a on the other of the left and right sides to generate the first display image 68 in the assist mode of the forward parking and the backward exit. Accordingly, the parking assist apparatus 36 can more reliably contain the host vehicle image 64 and the target frame 76a in the first display image 68 as compared with a case where the host vehicle image 64 is displayed at the center of the overhead image 72. As a result, even in the forward parking and the backward parking in which the field of view range of the overhead image 72 is narrow and the set path is long, the parking assist apparatus 36 can display the appropriate first display image 68 including the host vehicle image 64 and the target frame 76a on the display portion 40. Further, the parking assist apparatus 36 reduces the processing load of the controller 50 configured by the processor such as the CPU 36a by narrowing the field of view range of the overhead image 72, and thus the above effect can be realized by the microcomputer including the inexpensive CPU 36a and the like and the imaging portion 14 having a narrow angle of view.

The display image generation portion 58 superimposes the host vehicle image 64 on the rear side in the overhead image 72 in the forward parking mode in the parking assist apparatus 36 and superimposes the host vehicle image 64 on the front side in the overhead image 72 in the backward exit mode. Accordingly, in the assist mode, the parking assist apparatus 36 omits the overhead image 72 of the region on a side opposite to the traveling direction of the vehicle 10 and thus the host vehicle image 64 and the target frame 76a can be more reliably displayed in the first display image 68 by the overhead image 72 with emphasis on the region on the traveling direction side of the vehicle 10.

In the parking assist apparatus 36, the display image generation portion 58 superimposes the target frame 76a on the left side in the overhead image 72 in the forward parking mode and the backward exit mode to the target frame 76a of the left side of the vehicle 10 and superimposes the target frame 76a on the right side in the overhead image 72 in the forward parking mode and the backward exit mode to the target frame 76a of right side of the vehicle 10. Accordingly, the parking assist apparatus 36 can more reliably display the host vehicle image 64 and the target frame 76a, even with the first display image 68 including the overhead image 72 having a narrow field of view range.

In the parking assist apparatus 36, since the display image generation portion 58 superimposes the target frame 76a on the preset set path based on the set path data 66d, processing load required for calculation of the set path for setting the position where the target frame 76a is superimposed can be reduced.

The functions, connection relationships, number, arrangement, or the like of the configurations of each the embodiment described above may be appropriately changed, deleted, or the like within a range equivalent to the range of this disclosure and the scope of this disclosure. Each embodiment may be appropriately combined. The order of each step of each embodiment may be appropriately changed.

In the above embodiment, although an example of the parking assist system 30 having the four imaging portions 14 is given, this disclosure is not limited thereto. For example, the parking assist system 30 may have three or less or five or more imaging portions 14.

A parking assist apparatus according to an aspect of this disclosure includes: a peripheral image generation portion that generates an overhead image of a periphery viewed from above based on a captured image of a periphery of a vehicle; and a display image generation portion that generates a display image by superimposing a host vehicle image displaying a host vehicle on one of left and right sides in the overhead image and superimposing a target frame displaying a target of a movement destination of the vehicle on the other of the left and right sides in the overhead image in an assist mode of a forward parking or a backward exit.

According to the aspect of this disclosure, by superimposing the host vehicle image and the target frame on both sides of left and right sides of the overhead image, even in an assist mode of the forward parking or the backward exit which increases the set path to the target frame, an appropriate display image including the host vehicle image and the target frame can be displayed.

In the aspect of this disclosure, the display image generation portion may superimpose the host vehicle image on a rear side in the overhead image in the assist mode of the forward parking and may superimpose the host vehicle image on a front side in the overhead image in the assist mode of the backward exit.

According to the aspect of this disclosure with this configuration, in the assist mode, the overhead image of a region on the traveling direction side of the vehicle can be further displayed on the display image by the overhead image of a region on a side opposite to a traveling direction of the vehicle being omitted.

In the aspect of this disclosure, the display image generation portion may superimpose the target frame on a left side in the overhead image in a case of the assist mode for assisting the forward parking or the backward exit with respect to the target frame on a left side of the vehicle and may superimpose the target frame on a right side in the overhead image in a case of the assist mode for assisting the forward parking or the backward exit with respect to the target frame on a right side of the vehicle.

Accordingly, according to the aspect of this disclosure with this configuration, the host vehicle image and the target frame can be more reliably displayed even in the display image by an overhead image having a narrow field of view range.

In the aspect of this disclosure, the display image generation portion may superimpose the target frame on a preset set path in which the host vehicle image is set as a starting point.

Accordingly, according to the aspect of this disclosure with this configuration, since the target frame is superimposed on the preset set path, it is possible to reduce processing load required for setting the set path for setting a position where the target frame is superimposed.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A parking assist apparatus comprising:
a peripheral image generation portion that generates an overhead image of a periphery viewed from a view point above a vehicle based on a captured image of a periphery of the vehicle; and
a display image generation portion that generates a first display image by superimposing a host vehicle image displaying the vehicle on one of left and right sides in the overhead image viewed from the view point and superimposing a target frame displaying a target of a movement destination of the vehicle on the other of the left and right sides in the overhead image viewed from the view point in an assist mode of a forward parking or a backward exit;
wherein the display image generation portion generates a second display image by superimposing a second target frame displaying the target of the movement destination of the vehicle in a captured image of a periphery of the vehicle and displays the first display image and the second display image on a display portion, positions of the first target frame and the second target frame in the real world being at the same position.

2. The parking assist apparatus according to claim 1, wherein the display image generation portion superimposes the host vehicle image on a rear side in the overhead image in the assist mode of the forward parking and superimposes the host vehicle image on a front side in the overhead image in the assist mode of the backward exit.

3. The parking assist apparatus according to claim 1, wherein the display image generation portion superimposes both the target frame on a left side in the overhead image and the host vehicle image on a right side in the overhead image in a case of the assist mode for assisting the forward parking or the backward exit with respect to the target frame on a left side of the vehicle and superimposes both the target frame on a right side in the overhead image and the host vehicle image on a left side in the overhead image in a case of the assist mode for assisting the forward parking or the backward exit with respect to the target frame on a right side of the vehicle.

4. The parking assist apparatus according to claim 1, wherein the display image generation portion superimposes the target frame on a preset set path in which the host vehicle image is set as a starting point.

5. The parking assist apparatus according to claim 3, wherein the display image generation portion superimposes both the target frame on one of left and right sides in the overhead image and the host vehicle image on a center in the overhead image in a case of the assist mode for assisting the back parking.

* * * * *